Jan. 29, 1957 V. A. FLAGIELLO 2,779,152
AIR OPERATED CLOCK
Filed Dec. 8, 1954 3 Sheets-Sheet 1
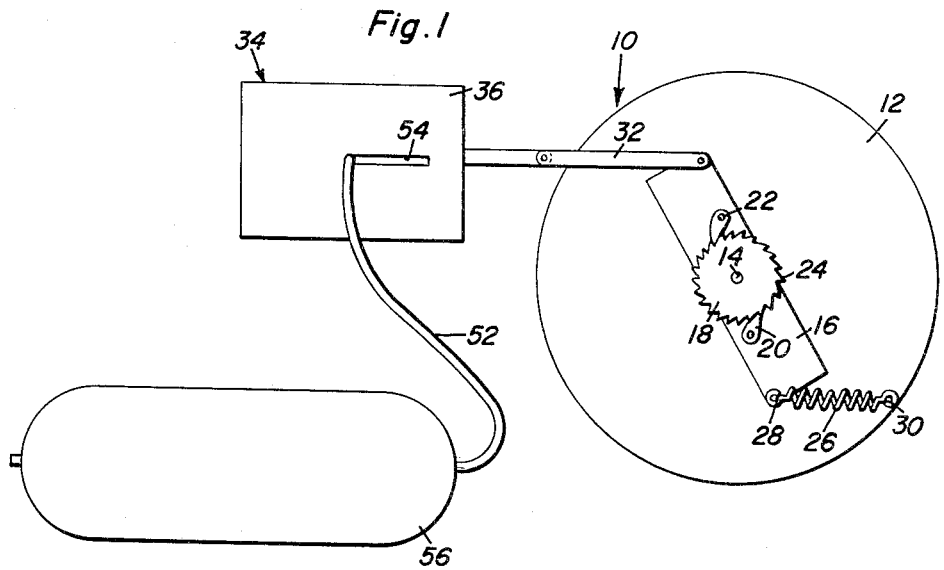
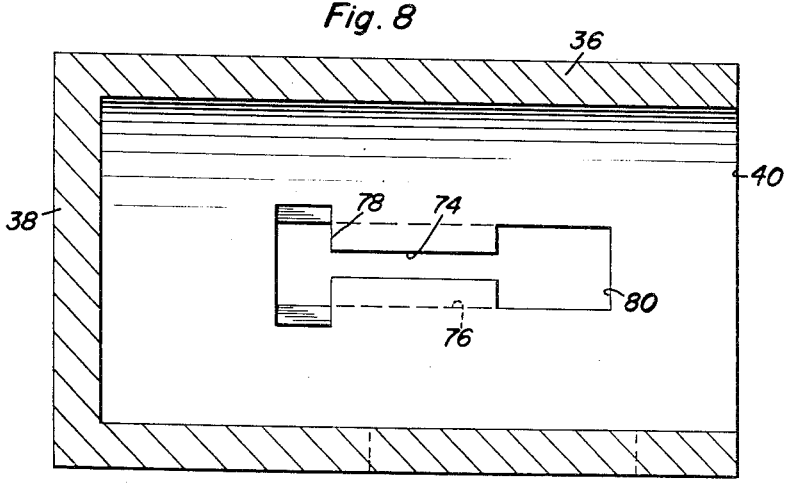
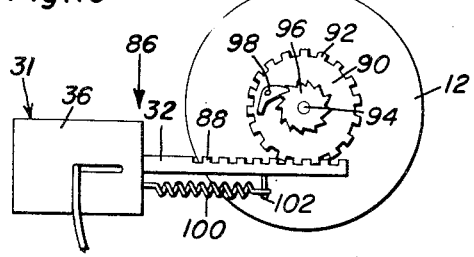
Vincent A. Flagiello
INVENTOR.
BY Clarence A. O'Brien
and Harvey B. Jacobson
Attorneys Jan. 29, 1957　　　　V. A. FLAGIELLO　　　　2,779,152
AIR OPERATED CLOCK Filed Dec. 8, 1954　　　　　　　　　　　　　3 Sheets-Sheet 2

Vincent A. Flagiello
INVENTOR.

BY
Attorneys

Jan. 29, 1957  V. A. FLAGIELLO  2,779,152
AIR OPERATED CLOCK
Filed Dec. 8, 1954  3 Sheets-Sheet 3
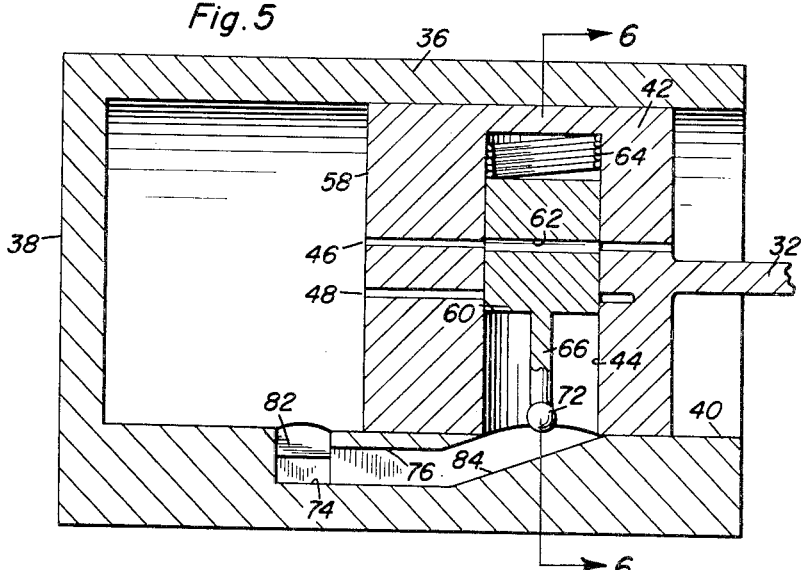
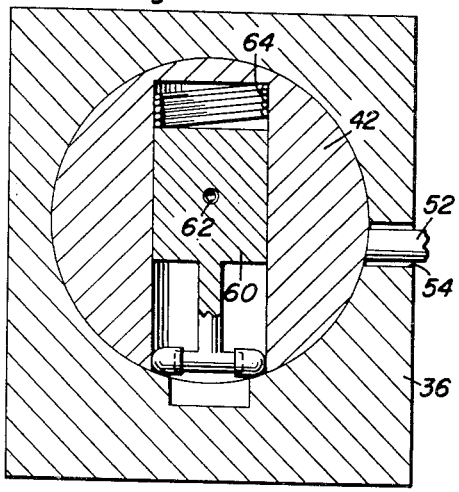
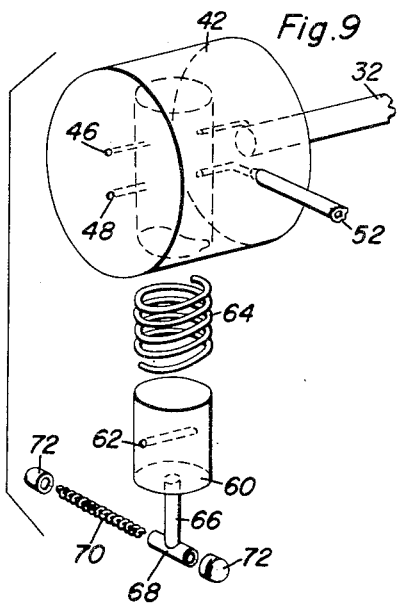
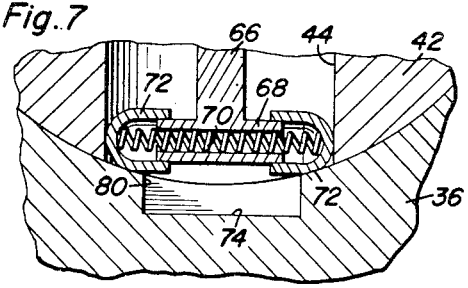
Vincent A. Flagiello
INVENTOR.

United States Patent Office 2,779,152
Patented Jan. 29, 1957

2,779,152
AIR OPERATED CLOCK
Vincent A. Flagiello, New Haven, Conn.
Application December 8, 1954, Serial No. 473,785
5 Claims. (Cl. 58—46)

This invention relates to an air operated clock and more specifically provides a clock primarily adapted to replace the electric clock in automobiles but which may be utilized wherever desired.

An object of this invention is to provide an air operated clock that will be automatically actuated and will keep time in a very accurate manner inasmuch as substantially a constant force will be exerted on the clock operating mechanism.

Another important object of the present invention is to provide an air operated clock that is simple in construction, easy to install, accurate in operation, well adapted for its intended purpose, relatively inexpensive to manufacture and characterized by its long wearing qualities and dependability.

A further object of the present invention is to provide an air operated clock especially adapted for use in automobiles which will eliminate the use of electricity by the clock and eliminate failures caused by corrosion, pitting of points and other failures normally appearing in electrical mechanisms.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a schematic view showing the construction of an air operated clock in accordance with the present invention;

Figure 5 is a sectional view similar to Figure 2 showing the actuating piston at one end of its movement;

Figure 6 is a transverse, vertical sectional view taken substantially upon a plane passing along section line 6—6 of Figure 5 showing the details and relationship of the actuating mechanism at one end of its movement;

Figure 7 is an enlarged sectional view showing the spring loaded follower which rides against one surface of the cylinder and controls the actuation of the actuating piston;

Figure 8 is a top plan longitudinal sectional view of the cylinder showing the details of construction of the control groove for receiving and guiding the follower for controlling the actuating mechanism;

Figure 9 is exploded perspective view showing the relationship and the details of the actuating piston and the control piston therefor;

Figure 10 is a schematic view showing a modified form of actuating mechanism.

Figure 2:
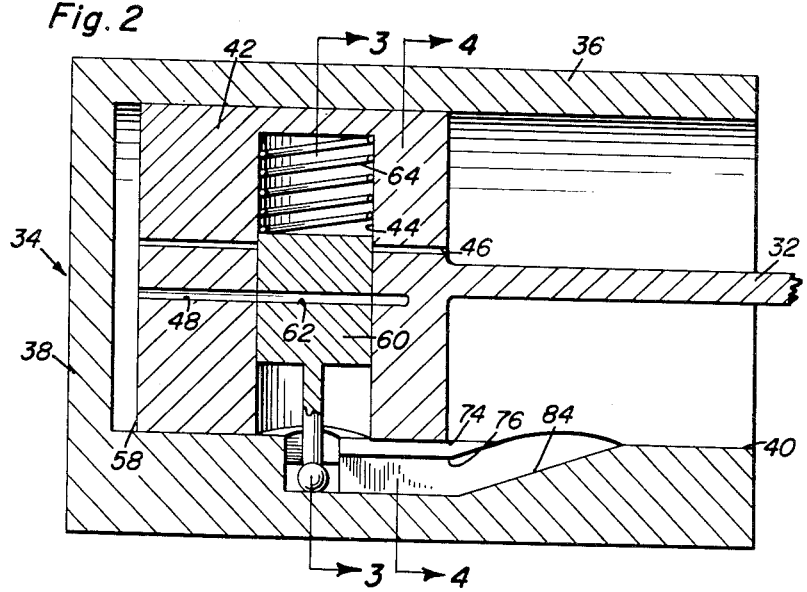
Figure 2 is a vertical, sectional view taken substantially upon a longitudinal center line passing through the center of the actuating cylinder and piston.
Figure 3:
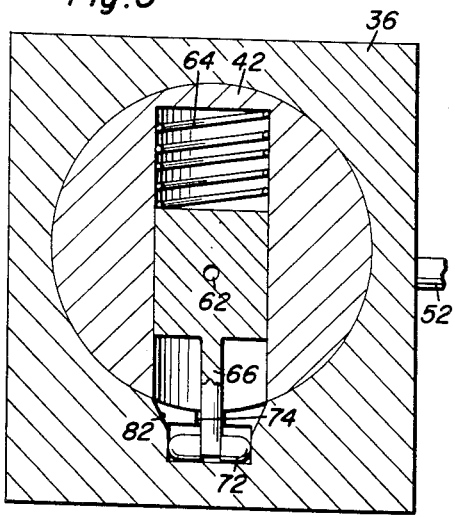
Figure 3 is a transverse, vertical sectional view taken substantially upon a plane passing along section line 3—3 of Figure 2 showing details of construction of the control mechanism for actuating the clock.
Figure 4:
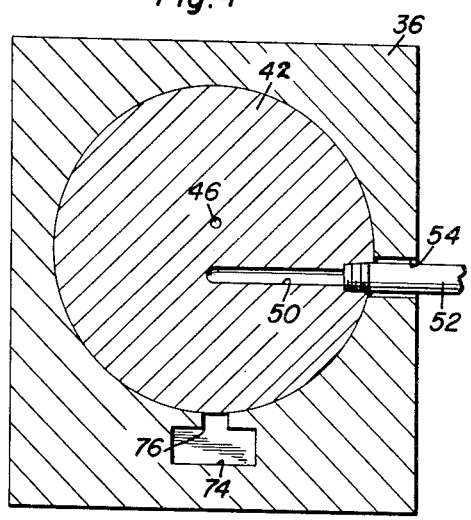
Figure 4 is a transverse, vertical sectional view taken substantially upon a plane passing along section line 4—4 of Figure 2 showing further details of construction of the clock mechanism.

Referring now specifically to the drawings, it will be seen that the numeral 10 generally designates the air operated clock of the present invention. The clock 10 generally includes a casing 12 having a shaft 14 extending therefrom with a plate 16 rotatable thereon and a ratchet gear 18 secured thereto. A pair of pawl members 20 are pivotally secured to the plate 16 by pivot pins 22 wherein rotational movement of the plate 16 about the shaft 14 in one direction will rotate the ratchet gear 18 and the shaft 14 as the pawls 20 will engage the teeth 24 on the periphery of the ratchet gear 18. The shaft 14 actuates the clock mechanism positioned in the housing 12 the details of which are not shown in the accompanying drawings as they form no part of the invention.

Extending between one corner of the plate 16 and the housing 12 is a tension coil spring 26 positioned over pins 28 and 30 positioned on the plate 16 and housing 12 respectively wherein the spring 26 will continuously urge the plate 16 in one direction of rotation when it has been tensioned by a sectional piston rod 32 connected to the diagonally opposed corner of the pivot plate 16. The piston rod 32 urges the plate 16 abut the pivot shaft 14 by an actuating mechanism generally designated by the numeral 34. When the actuating mehcanism 34 extends the piston rod 32 outwardly, the pawls 20 will not engage the teeth 24 thereby permitting the plate 16 to pivot about the shaft 14 and elongate the tension spring 26 thereby tensioning the spring 26 wherein the spring 26 will tend to urge the plate 16 in the opposite direction about pivot shaft 14 wherein the pawl 20 will engage the teeth 24 on the ratchet gear 18 thereby rotating the shaft 14 for actuating the clock mechanism in the housing 12. The tension of the spring 26 also urges the piston rod 32 inwardly in the actuating mechanism 34 wherein the actuating mechanism 34 is automatic and will repeat its cycle at predetermined intervals.

Referring now specifically to Figures 2–9, it will be seen that the actuating mechanism 34 generally includes a cylinder 36 having a closed end 38 and an open end 40 with an actuating piston 42 slidable therein and integrally formed with the piston rod 32. The actuating piston 42 is provided with a transverse bore 44 which extends from one side of said piston 42 to a position adjacent the other side thereof thereby forming a closed transverse bore 44. Extending longitudinally completely through the piston 42 is a small longitudinal bore 46 that communicates with the transverse bore 44 thereby forming a continuous passage through the longitudinal length of the piston 42. In spaced relation to the longitudinal bore 46 is a second longitudinal bore 48 which is slightly larger than the longitudinal bore 46 and the longitudinal bore 48 terminates adjacent the rear end of the piston 46 and extends at right angles in a transverse manner as indicated by the numeral 50 wherein a supply line 52 is screw threadedly attached to the piston 42 and slidably received in a slot 54 in the cylinder 36 thereby permitting longitudinal movement of the piston 42. The supply line 52 is connected to an air pressure tank 56 for admitting air under pressure to the passageway 50 that is in communication with the longitudinal bore 48 which opens on the face 58 of the piston 42 which is in opposition to the closed end 38 of the cylinder 36. The longitudinal slot 54 in the cylinder 36 acts as a guide and stop for the piston 42 thereby limiting the longitudinal movement of the piston 42 within the cylinder 36.

Positioned in the actuating piston 42 and slidably received in the transverse bore 44 is a control piston 60 having a transverse passage 62 therein for alignment with the bore 48 in the piston 42 when the control piston 60 is in a selected position. Positioned between the inner end of the control piston 60 and the closed end of the transverse bore 44 is positioned a compression coil spring 64 which continuously urges the control piston 60 towards the open end of the transverse bore 44. The lower end of the control piston 60 is provided with a rigidly and longitudinally projecting piston rod 66 terminating in a transverse tubular member 68 which forms substantially a T on the end of the control piston 60. Positioned within the tubular member 68 is a compression coil spring 70 having a pair of end caps 72 positioned thereover wherein the end caps 72 telescopically engage over the ends of the tubular member 68 on the end of the piston rod 66. It is noted that the end caps 72 are rounded on the ends and are slidably telescopically mounted on the end of the tube 68 wherein the spring 70 may be compressed until the inner ends of the cap 72 substantially engage the opposite edges of the piston rod 66. It is noted in Figures 2 and 5 that the transverse passage 62 in the control piston 60 is selectively in communication with the longitudinal bore 48 and the longitudinal bore 46 during movement of the actuating piston 42 wherein the device in Figure 5 is illustrated with the passage 62 in communication with the passage 46 and in Figure 2 the passage 62 is illustrated in communication with the passage 48.

In the bottom of the cylinder 36 is provided an elongated groove 74 that is provided with a central undercut portion 76 and enlarged end portions 78 and 80. At the enlarged end portion 78 at one end of the groove 74 the side walls thereof are provided with inwardly extending cam surfaces 82 and the enlarged portion 80 at the other end of the groove 74 is provided with an upwardly inclined cam surface 84 wherein the groove 74 together with the enlarged ends 78 and 80 receive the lower end of the piston rod 66 together with the tubular member 68 and the cap 72 thereby forming a guide for the control piston 60 and the caps 72 substantially form a follower which rides in the guide or groove 74. It is noted that the side edges of the enlarged portion 80 at one end of the groove 74 are less than the distance between the side edges of the other enlarged portion 78 so that the cap 72 will not pass downwardly through the enlarged portion 80 but will pass downwardly through the enlarged portion 78 for engagement with the cam surfaces 82.

In practical operation, the device will be actuated with the actuating piston 42 in the position as shown in Figure 2 and will move to a position as illustrated in Figure 5 wherein the cycle will be repeated at pre-determined intervals. With the device as illustrated in Figure 2, air is entered through the supply line 52 from the supply tank 56 wherein air passes through the passage 50 and since the control piston 60 is at its lowermost position the air will continue through the transverse passage 62 and the longitudinal passage 48 into the area between the closed end 38 of the cylinder 36 and the face 58 of the piston 42. Since the compression spring 64 has urged the control piston 60 downwardly wherein the caps 72 on the tubular member 68 have engaged the cam surfaces 82 and been compressed into the bottom of the groove 74, the compressed air entering the actuating mechanism 34 will urge the piston 42 towards the open end 40 of the cylinder 36 thereby moving the piston rod 32 and pivoting the plate 16 in the manner described before for tensioning the spring 26. As the piston 42 moves towards the open end of the cylinder 36, the spring urged cap 72 together with the spring 70 and the tubular member 68 ride in the bottom of the groove 74 and is held therein by the undercut portion 76 until the caps 72 come into contact with the upwardly inclined cam surface 84 which communicates with the enlarged portion 80 at the other end of the groove 74. The expansion of the compressed air in the cylinder will assure movement of the piston 42 to its outermost position. Due to the movement of the piston 42 and the engagement of the caps 72 and the inclined bottom 84 of the groove 74, the piston 60 will be urged upwardly thereby compressing the spring 64. As soon as the caps 72 pass upwardly beyond the upper edges of the enlarged portion 80 of the groove 74, the compression spring 70 will urge the caps 72 outwardly wherein the caps 72 will then engage the surface of the cylinder 36 adjacent the enlarged opening 80 substantially as illustrated in Figure 6. In this position, the transverse passage 62 is in alignment with the longitudinal passage 46 in the actuating piston 42, as illustrated in Figure 5, thereby permitting compressed air within the cylinder 36 between the closed end 38 and the face 58 of the piston 42 to escape to the atmosphere wherein the piston 42 will gradually return to the closed end 38 of the cylinder 36 under a force exerted by the tension spring 26 connected to the plate 16. As the piston 42 moves forwardly, the end caps 72 on the tubular member 68 ride on the inner surface of the cylinder 36 until they pass over the rear edge of the enlarged opening 78 wherein the compression spring 64 will urge the control piston 60 downwardly wherein the cam surfaces 82 will telescope the caps 72 inwardly and compress the spring 70 wherein the tubular member 68 together with the caps 72 and spring 70 will be positioned in the bottom of the groove 74, thereby aligning the passage 62 with the longitudinal passage 48 and the passage 50 for admitting a supply of compressed air into the cylinder 36 between the face 58 of the piston 42 and the closed end 38 of the cylinder 36 thereby repeating the above described cycle. By controlling the size of the various apertures and passages through the piston 42, the timed interval of automatic actuation of the mechanism 34 may be predetermined.

As illustrated in Figure 10, it will be seen that the numeral 86 illustrates a modified form of the invention wherein the piston rod 32 is provided with rack teeth 88 for engagement with a gear 90 having teeth 92 thereon for engagement with the rack teeth 88 wherein the gear 90 is rotatably journaled on shaft 94 having a ratchet gear 96 thereon for engagement with a pawl 98 pivotally mounted on the gear 90. A tension spring 100 is positioned between a pin 102 on the piston rod 32 and the other end of the spring 100 is terminally secured to the actuating mechanism 34 including the piston 36, and the other mechanism as described in Figures 1–9.

Figure 11:
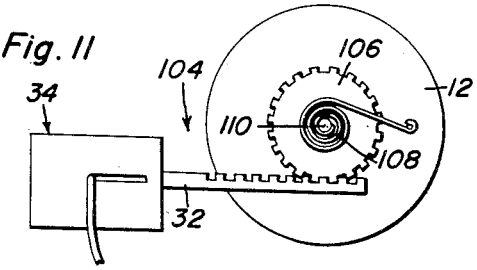
Figure 11 is a schematic view showing another modified form of the air operated clock of the present invention.

As illustrated in Figure 11, the numeral 104 indicates another modified form of clock of the present invention wherein a ratchet operated gear 106 is utilized for tensioning a spiral spring 108 which is utilized to drive the central shaft 110.

In each instance, the actuating mechanism 34 operates in exactly the same manner wherein the mechanism 34 is automatically controlled by the specific construction of the actuating piston 42 and the control piston 60 together with the guide slot 74 for receiving the followers including the cap 72 and the tubular member 68 with the spring 70 disposed therein.

The actuating mechanism illustrated in Figure 10 has a movement arm of constant length for exerting a constant force on the center shaft. Also, the length of the stroke of the actuating mechanism is shorter thereby enhancing the timekeeping ability of the device. It will be seen that the interval of automatic actuation may be controlled by varying the size of the various apertures and boxes in the mechanism and carrying the characteristics of the cam portions.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A clock comprising a spring device for driving a clock mechanism, and means for automatically tensioning said spring device at intervals, said means including a fluid pressure driven actuating piston and cylinder arrangement, and control means within said arrangement for controlling the movement of the actuating piston, said control means including a longitudinal bore extending through said actuating piston, a partial longitudinal bore communicating with a pressurized fluid supply line, a control member selectively registering with said bore for selective entry of pressurized fluid and exhaust of fluid, and means for controlling the movement of said control member.

2. A fluid pressure driven actuating piston and cylinder having control means for controlling the movement of the actuating piston, said control means including a longitudinal bore extending through said actuating piston, a partial longitudinal bore communicating with a pressurized fluid supply line, a control member selectively registering with said bores for selective entry of pressurized fluid and exhaust of fluid, and means for controlling the movement of said control member, said control member including a control piston movable in a transverse socket in said actuating piston, a transverse passage in said control piston, a coil spring positioned between the inner end of said control piston and the closed end of said socket, cam guide means in the wall of said cylinder, and a follower on said control piston for movement in said cam guide means for selectively aligning the passage in said control piston with the bores in said actuated piston.

3. A clock comprising a spring device for driving a clock mechanism, and means for automatically tensioning said spring device at intervals, said means including a fluid perssure driven actuating piston and cylinder arrangement, and control means within said arrangement for controlling the movement of the actuating piston, said control means including a longitudinal bore extending through said actuating piston, a partial longitudinal bore communicating with a pressurized fluid supply line, a control member selectively registering with said bores for selective entry of pressurized fluid and exhaust of fluid, and means for controlling the movement of said control member, said control member including a control piston movable in a transverse socket in said actuating piston, a transverse passage in said control piston, a coil spring positioned between the inner end of said control piston and the closed end of said socket, cam guide means in the wall of said cylinder, and a follower on said control piston for movement in said cam guide means for selectively aligning the passage in said control piston with the bores in said actuating piston, said cam guide means including an elongated groove, an enlarged portion at one end of said groove having inwardly extending cam side walls, said follower including a pair of laterally movable spring urged members movable in said groove when compressed, said coil spring urging the control piston downwardly when the spring urged members are aligned with the enlarged portion of said groove thereby engaging the spring urged members with the cam side walls for moving the spring urged members inwardly for movement in said groove thereby aligning the passage in the control piston with the partial bore in the actuating piston for admitting pressurized fluid into the cylinder for moving the actuating piston.

4. A clock comprising a spring device for driving a clock mechanism, and means for automatically tensioning said spring device at intervals, said means including a fluid pressure driven actuating piston and cylinder arrangement, and control means within said arrangement for controlling the movement of the actuating piston, said control means including a longitudinal bore extending through said actuating piston, a partial longitudinal bore communicating with a pressurized fluid supply line, a control member selectively registering with said bores for selective entry of pressurized fluid and exhaust of fluid, and means for controlling the movement of said control member, said control member including a control piston movable in a transverse socket in said actuating piston, a transverse passage in said control piston, a coil spring positioned between the inner end of said control piston and the closed end of said socket, cam guide means in the wall of said cylinder, and a follower on said control piston for movement in said cam guide means for selectively aligning the passage in said control piston with the bores in said actuating piston, said cam guide means including an elongated groove, an enlarged portion at one end of said groove having inwardly extending cam side walls, said follower including a pair of laterally movable spring urged members movable in said groove when compressed, said coil spring urging the control piston downwardly when the spring urged members are aligned with the enlarged portion of said groove thereby engaging the spring urged members with the cam side walls for moving the spring urged members inwardly for movement in said groove thereby aligning the passage in the control piston with the partial bore in the actuating piston for admitting pressurized fluid into the cylinder for moving the actuating piston, said groove having an upwardly inclined bottom wall remote from said cam side walls for urging the control piston upwardly when the actuating piston moves outwardly from the cylinder thereby aligning the passage in the control piston with the longitudinal bore in said actuating piston thereby exhausting pressurized fluid from the cylinder and permitting return of the actuating piston into the cylinder.

5. A fluid motor comprising a pressure actuated piston and cylinder arrangement having means for automatically controlling the movement of the piston, said means including a longitudinal bore extending through said actuating piston, a partial longitudinal bore communicating with a pressurized fluid supply line, a control member selectively registering with said bores for selective entry of pressurized fluid and exhaust of fluid, and means for controlling the movement of said control member, said control member including a control piston movable in a transverse socket in said actuating piston, a transverse passage in said control piston, a coil spring positioned between the inner end of said control piston and the closed end of said socket, cam guide means in the wall of said cylinder, and a follower on said control piston for movement in said cam guide means for selectively aligning the passage in said control piston with the bores in said actuating piston, said cam guide means including an elongated groove, an enlarged portion at one end of said groove having inwardly extending cam side walls, said follower including a pair of laterally movable spring urged members movable in said groove when compressed, said coil spring urging the control piston downwardly when the spring urged members are aligned with the enlarged portion of said groove thereby engaging the spring urged members with the cam side walls for moving the spring urged members inwardly for movement in said groove thereby aligning the passage in the control piston with the partial bore in the actuating piston for admitting pressurized fluid into the cylinder for moving the actuating piston.

References Cited in the file of this patent

UNITED STATES PATENTS

| | | |
|---|---|---|
| 1,728,267 | Fischer | Sept. 17, 1929 |
| 2,254,858 | Reutter | Sept. 2, 1941 |
| 2,519,713 | Steinmann | Aug. 22, 1950 |
| 2,539,241 | Forsmark | Jan. 23, 1951 |
| 2,649,078 | Kelly | Aug. 18, 1953 |
| 2,661,726 | Alfieri | Dec. 8, 1953 |

FOREIGN PATENTS

| | | |
|---|---|---|
| 462,433 | France | Nov. 22, 1913 |
| 630,380 | Germany | May 27, 1936 |